(12) United States Patent
Etzel

(10) Patent No.: US 6,168,823 B1
(45) Date of Patent: *Jan. 2, 2001

(54) PRODUCTION OF SUBSTANTIALLY PURE KAPPA CASEIN MACROPEPTIDE

(75) Inventor: Mark R. Etzel, Madison, WI (US)

(73) Assignee: Wisconsin Alumni Research Foundation, Madison, WI (US)

( * ) Notice: Under 35 U.S.C. 154(b), the term of this patent shall be extended for 0 days.

This patent is subject to a terminal disclaimer.

(21) Appl. No.: 09/127,573

(22) Filed: Jul. 31, 1998

Related U.S. Application Data

(63) Continuation-in-part of application No. 08/947,700, filed on Oct. 9, 1997, now Pat. No. 5,968,586.

(51) Int. Cl.[7] .................. A23J 1/20; A23C 9/14
(52) U.S. Cl. ............... 426/656; 426/495; 426/422; 426/271; 426/583
(58) Field of Search ..................... 426/656, 271, 426/422, 495, 583

(56) References Cited

U.S. PATENT DOCUMENTS

| | | |
|---|---|---|
| 5,169,936 | 12/1992 | Staples et al. . |
| 5,278,288 | 1/1994 | Kawasaki et al. . |
| 5,280,107 | 1/1994 | Kawasaki et al. . |
| 5,310,648 | 5/1994 | Arnold et al. . |
| 5,372,719 | 12/1994 | Afeyan et al. . |
| 5,453,199 | 9/1995 | Afeyan et al. . |
| 5,641,539 | 6/1997 | Afeyan et al. . |
| 5,646,016 | 7/1997 | McCoy et al. . |
| 5,780,439 * | 7/1998 | Mendy et al. .................. 514/21 |

OTHER PUBLICATIONS

Arnold & Haymore, 1991, *Science* 252, 1796–1797.
Buecher, S. et al., 1994, *J. Nutr. Biochem.*, 5, 578–584.
Corring, T. et al., 1997, *Proc. Intl. Whey Conf.*, Oct. 27–29, 34.
Dalgleish, D.G., 1982, *Advanced Dairy Chemistry*, (Edited by P.F. Fox), Chapter 14, Applied Science Publishers, New York.
Fox, P.F., 1989, *Developments in Dairy Chemistry–4 Functional Milk Proteins*, (Edited by P.F. Fox), pp. 1–53. Elsevier Applied Science, New York.
Kawakami, H., et al., 1992, *Milchwissenschaft* 47, 688–693.
Kawasaki, Y., et al., 1993, *Milchwissenschaft* 48, 191–195.
Marshall, S. C., 1991, *Food Research Quarterly* 51, 86–89.
Minkiewicz et al., 1996, *J. Chromat.* 743, 123–135.
Outinen et al., 1995, *Milchwissenschaft* 50, 570–574.
Pedersen, B., 1994, *Food Technol.* 48, 96–98, 76.
Saito, T., et al., 1991, *Journal of Dairy Science*, 74, 2831–2837.
Shammet et al., 1992, *Milchwissenschaft* 47, 615–619.
Stan, E. et al., 1983, *Bull. Exp. Biol. Med.*, 96, 889–891.
Tanimoto, M. et al., 1992, *Bioscience, Biotechnology and Biochemistry*, 56, 140–141.

* cited by examiner

Primary Examiner—Anthony Weier
(74) *Attorney, Agent, or Firm*—DeWitt Ross & Stevens S.C.

(57) ABSTRACT

The present invention relates to a process for producing a substantially pure κ-casein macropeptide fraction having nutraceutical properties by contacting whey with an anion exchanger to yield a bound whey protein fraction enriched in κ-casein macropeptide fraction and an unbound whey protein fraction depleted in κ-casein macropeptide; and contacting the bound whey protein fraction enriched in κ-casein macropeptide fraction with an adsorbent, specifically an immobilized metal affinity adsorbent, to separate out the substantially pure κ-casein macropeptide fraction.

19 Claims, 3 Drawing Sheets

PRODUCTION OF SUBSTANTIALLY PURE KAPPA CASEIN MACROPEPTIDE

REFERENCE TO RELATED PATENT APPLICATION

The present application is a continuation-in-part of U.S. patent application Ser. No. 08/947,700, filed Oct. 9, 1997, U.S. Pat. No. 5,968,586 entitled "Production of Kappa Casein Macropeptide for Nutraceutical Uses."

GOVERNMENT SUPPORT

This invention was made with United States government support awarded by the following agency: NSF Grant Nos: BCS-9109577; BES-9631962. The United States has certain rights to this invention.

FIELD OF THE INVENTION

The present invention relates to a process for producing kappa-casein macropeptide having nutraceutical properties. The present invention specifically relates to a process for producing substantially-pure kappa-casein macropeptide from whey using anion exchange and immobilized metal ion affinity chromatography. The present invention is also directed to a method for providing a means for large-scale production of kappa-casein macropeptide in a substantially pure form using fewer steps than methods of similar capability in purity.

BIBLIOGRAPHY

Complete bibliographic citations of the references referred to herein can be found in the Bibliography section immediately preceding the claims.

BACKGROUND OF THE INVENTION

Nutraceuticals are foods that have specific medicinal and nutritional benefits. One nutraceutical, kappa-casein (κ-casein), macropeptide comprises 15–20% of the protein in whey, making its supply plentiful and readily available for use in dietetic foods and nutraceuticals.

Widely differing extents of glycosylation of κ-casein macropeptide (CMP) exist in whey and whey products, ranging from fully-glycosylated CMP (called κ-casein glycomacropeptide, or GMP) to non-glycosylated CMP. For purposes of the present invention, CMP includes all forms of the κ-casein macropeptide from the fully-glycosylated κ-casein glycomacropeptide to the non-glycosylated κ-casein glycomacropeptide. As discussed by Shammet et al. (1992), total CMP, which includes all degrees of glycosylation, is measured as non-protein nitrogen (NPN-2) soluble in 2% trichloroacetic acid (TCA). GMP is measured as non-protein nitrogen soluble in 12% TCA (NPN-12). The difference between NPN-2 and NPN-12 is non-glycosylated CMP.

CMP is the moiety cleaved from κ-casein at the $Phe^{105}$-$Met^{106}$ position by chymosin during cheese making (Dalgleish, 1982; Fox, 1989). CMP occurs at a concentration of 1.2 to 1.5 g/L in sweet whey, e.g. Cheddar cheese whey, (Marshall, 1991). Kawasaki et al. referred to previously reported nutritional advantages of GMP (U.S. Pat. No. 5,278,288 to Kawasaki and Dosako) and Tanimoto et al. (1992) suggested the utilization of GMP in dietetic foods and pharmaceuticals. The advantage of CMP as a substrate for hydrolysis is that it does not contain the amino acids tyrosine, phenylalanine, and tryptophan. These are hydrophobic aromatic amino acids responsible for the bitter taste of some peptides (Pedersen, 1994). Alternatively, Marshall (1991) suggested that CMP can be used as a protein source for the treatment of phenylketonuria, a hereditary disorder in which phenylalanine cannot be metabolized.

On a laboratory scale, CMP has been purified from κ-casein in bovine whey using TCA precipitation (Shammet et al., 1992). GMP has been purified from bovine whey by alcohol precipitation after heat coagulation of whey protein (Saito et al., 1991). These methods are unlikely to be economical for large-scale manufacturing.

On a large scale, several methods have been developed using ultrafiltration (Kawakami et al., 1992; Kawasaki et al., 1993) and ion exchange (U.S. Pat. No. 5,278,288 to Kawasaki and Dosako; U.S. Pat. No. 5,290,107 to Kawasaki et al.) to purify GMP from whey or whey protein concentrate. However, the recovery of GMP using these methods is uneconomically low, at most 18%.

The basis of ultrafiltration purification is that the apparent molecular weight of GMP is 10 to 30 kDa at pH 3.5 and 20 to 50 kDa at pH 7.0. At pH 3.5, GMP permeates 20 to 50 kDa molecular weight cutoff (MWCO) ultrafiltration systems while larger proteins are retained by the membrane. Then at pH 6.5, GMP is retained by the same MWCO membranes while small molecular weight contaminants such as peptides pass through the filter.

Other methods have been developed to purify CMP from whey by anion exchange. U.S. Pat. No. 5,280,107 to Kawasaki et al. relates to contacting whey, adjusted to pH 4 or lower, with an anion exchanger to adsorb CMP. The adsorbed fraction is eluted and then concentrated and desalted to obtain the CMP. However at a pH of about 4 or lower, largely glycosylated CMP would be adsorbed to the anion exchanger, leaving unadsorbed and unrecovered a large amount of valuable non-glycosylated material. Kawasaki et al. state that because the sialic acids present in GMP have a pKa value of 2.7, these moieties have a net negative charge at pH values as low as 3 to 4. In non-glycosylated CMP, the acidic amino acid side chains (aspartic and glutamic acid) have a pKa of 3 to 5, and would have a substantial net negative charge only at a pH 5 and higher. The presence of sialic acids allowed Kawasaki et al. to separate GMP from proteins which lack sialic acids, by adsorbing the GMP to an anion exchanger at pH 4 or lower, because the other proteins are neutrally or positively charged at this pH. However, the method of Kawasaki et al. would not be suitable for recovering both glycosylated and non-glycosylated CMP from whey because non-glycosylated CMP would not bind strongly to an anion exchanger until it had a substantial net negative charge, which would occur only at pH 5 and higher.

Outinen et al (1995) adjusted whey to pH 5 and loaded it into an anion exchange column. The column was rinsed with water and the CMP fraction eluted with 2% sodium chloride. No downstream process was developed to remove contaminating peptides which contain aromatic amino acids. However, many applications for CMP require a low concentration of proteinaceous materials containing aromatic amino acids. For example, CMP can be used as a source or protein for patients with phenylketonuria as described previously.

Separation and purification accounts for a large proportion of the production cost of proteins. The main problem with processes based on precipitation methods is that achieving a pure product from a dilute solution such as whey is not commercially economical. The difficulty with ion exchange-based methods is the efficient production of a pure product. No prior art has used immobilized metal affinity chromatography to purify CMP.

SUMMARY OF THE INVENTION

The present invention is directed to a process for producing CMP from whey comprising contacting the whey with an anion exchanger to yield an adsorbed whey protein fraction enriched in CMP and a non-adsorbed whey protein fraction depleted in CMP; and then contacting the adsorbed whey protein fraction with an adsorbent to separate CMP from the whey protein fraction.

The present invention is also directed to a process for producing CMP from whey which comprises adjusting the whey to a pH greater than about 4; contacting the whey with an anion exchanger to yield a bound whey protein fraction enriched in κ-casein macropeptide and an unbound whey protein fraction depleted in κ-casein macropeptide; eluting the bound whey protein fraction enriched in κ-casein macropeptide; and contacting the eluted bound whey protein fraction enriched in κ-casein macropeptide with an immobilized metal affinity adsorbent to separate out the remaining whey protein fraction and obtain the substantially purified CMP.

The use of metal affinity chromatography to purify CMP from whey is novel and was discovered by experiment. When the CMP-rich whey protein fraction was passed through a metal affinity column, all the whey proteins except CMP were adsorbed, leaving the substantially pure CMP to pass through the column as effluent. The invention therefore provides for an "on-off" method for producing pure or substantially purified CMP.

The combination of anion exchange followed by IMAC adsorption is important for the success of the process for several reasons. IMAC adsorption is relatively expensive and because it does not bind the CMP by itself, it would not be able to remove lactose, fat and minerals from the CMP or be able to concentrate it compared to its concentration in whey. By preceding the IMAC step with an anion exchange step, the CMP is bound to and concentrated on the anion exchanger and rinsed free of lactose, fat and minerals, and the majority of the whey proteins. The upstream anion exchange step reduces the demands on the downstream IMAC step for adsorption capacity because the IMAC step only needs to remove small amounts of proteinaceous contaminants. Because these contaminants are present at low concentrations after the anion exchange step, and CMP does not adsorb to the IMAC adsorbent, the IMAC adsorbent does not saturate rapidly, meaning large volumes of the elution solution can be treated before the IMAC adsorbent must be regenerated. This improves the economics of the process.

Thus, the invention provides a large-scale low-cost method for producing purified CMP using two synergistic adsorption steps. The invention also provides a means for the large-scale production of CMP in a very pure form using fewer steps than previous methods. For example, the process of the present invention uses one less step than other methods of similar capability in purity of product and produces higher purity than the methods described above in the description of the prior art.

The whey protein isolate, i.e., the contaminants separated from CMP and bound to the IMAC column, is also commercially valuable and could be concentrated and sold as whey protein or fractionated into α-lactalbumin and β-lactoglobulin.

The present invention is also directed to a process for producing a whey protein concentrate substantially depleted in κ-casein macropeptide from whey which comprises adjusting the whey to a pH greater than about 4, contacting the whey with an anion exchanger to yield a bound whey protein fraction enriched in κ-casein macropeptide and an unbound whey protein fraction depleted in κ-casein macropeptide, and eluting the bound whey protein fraction enriched in κ-casein macropeptide from the unbound whey protein fraction depleted in κ-casein macropeptide. A whey protein concentrate substantially depleted in κ-casein macropeptide for use in food products, such as nutraceuticals, animal feeds and infant formula, produced according to the above process is also contemplated.

The unadsorbed whey protein fraction left after contact with the anion exchanger is depleted in CMP, which makes it commercially valuable for use in infant formula, for example. After concentration and drying, this fraction would be a powdered whey protein concentrate (WPC) depleted in CMP. WPC is used in infant formula instead of dried milk because it is closer in protein composition to human mother's milk. For example, human milk contains nearly 90% less casein than bovine milk (3.2 vs. 26 g/L), whereas bovine whey is largely depleted in casein. However, the protein composition of bovine whey is not an exact match to the protein composition of mother's milk either. For example, since CMP is the moiety cleaved from κ-casein, and bovine milk contains 270% more κ-casein than mother's milk, infant formula based on whey protein has a great excess of CMP compared to the level of CMP normal in an infant's diet. Therefore, a powdered WPC depleted in CMP, such as from the product of this invention, would be valuable as an ingredient in infant formula.

Furthermore, the anion exchange step preferentially binds the whey protein β-Lactoglobulin as well as CMP. β-Lactoglobulin is plentiful in bovine whey, whereas mother's milk contains none, making its presence undesirable in infant formula.

Additionally, CMP reportedly acts to suppress appetite in humans (Corring, T. et al, 1997) and other animals (Stan, E. et al, 1983; Buecher, S. et al, 1994) making its presence undesirable in animal feed, such as for baby pigs, and in human infant formula, where rapid weight gain is desired. This further enhances the commercial value of the whey left over after the contact with the anion exchanger in the process of the present invention because it is depleted in CMP.

The process of the present invention is advantageously applicable to large-scale commercial production of CMP in a substantially pure form and CMP-depleted WPC.

There is a high value-added market for whey proteins for foods for infants, geriatrics, individuals with allergic reactions to particular compounds, and individuals with enzyme deficiency. This is the growing nutraceutical marketplace. However, the bitterness of hydrolysates limits its use, and the removal of bitter peptides from the hydrolysate is expensive. The advantage of CMP as a substrate for hydrolysis is that it does not contain the hydrophobic amino acids tyrosine, phenylalanine, and tryptophan that make peptides bitter.

The present invention offers increased purity, lower cost, and increased throughput compared to existing processes, and a hydrolyzed, non-bitter nutrient solution for human consumption. It also produces a non-fat, low-lactose, high protein product (CMP) for food use.

The aims, objects, and advantages of the above-described multi-component value-added concentrate will become apparent upon a complete reading of the Detailed Description, drawings, and attached claims, below.

DETAILED DESCRIPTION OF INVENTION

Figure 1:
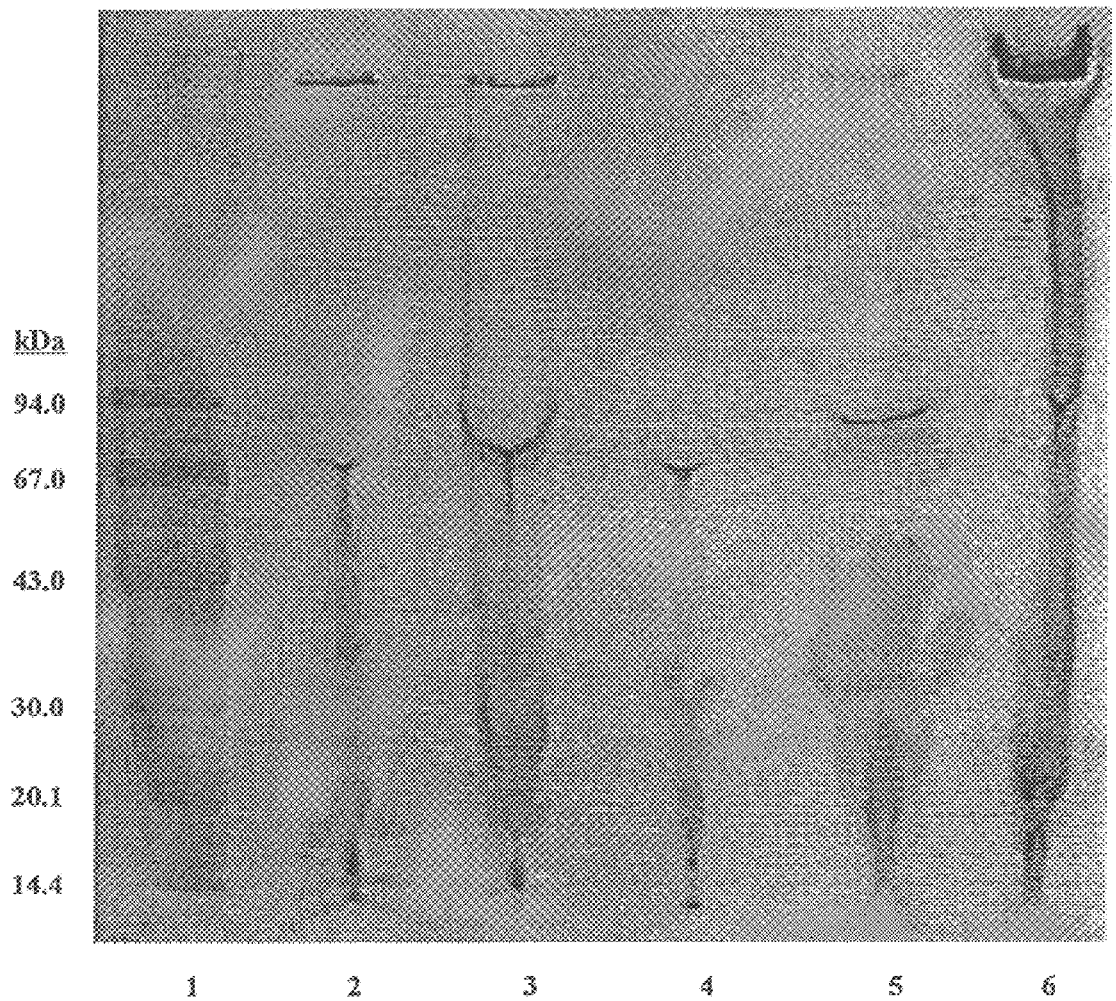
FIG. 1 is an SDS-PAGE analysis of the samples from the anion exchanger and the IMAC adsorbent in Example 1.

The novelty of the invention is based on the discovery that whey proteins bind to immobilized metal ions but CMP does not. This observation is attributed to the fact that immobilized transition metal ions bind to proteins and peptides containing surface histidine and cysteine amino acid residues at about pH 5.5 to 8.5, and that is chiefly the number of surface histidines that controls the binding strength (Arnold and Haymore, 1991). Cysteine residues are rarely at the surface of a protein and do not bind as strongly as histidine residues. However, histidine is a relatively rare amino acid, and many natural proteins contain no surface histidines at all. Therefore, although impurities such as whey proteins and peptide hydrolysis products of caseins and whey proteins contain some histidine residues, whereas CMP does not, it is not obvious that each of these impurities contains multiple surface histidines sufficient in number to cause strong binding to an IMAC adsorbent. Because it was discovered that other proteins in whey do bind to an IMAC adsorbent, CMP can be purified from residual protein and peptide impurities in whey by adsorption of the impurities onto an IMAC adsorbent.

The following describes in detail the production of CMP for food and medical uses by the present invention.

I. Whey

Any kind of whey containing CMP may be used. Whey is defined as the thin, watery part of milk that separates from the thicker part (curds) after coagulation. The major dry-matter components in whey are lactose (approximately 75% on a total solids basis), protein (approximately 13%) and ash (approximately 9%). The ratio between the components changes depending on the process involved in its preparation. Examples of whey include cheese whey, rennet casein whey and products of these wheys such as whey protein concentrate and dried whey. Reconstitution of dried whey products with water is necessary before use. Furthermore, purified κ-casein and other casein products such as sodium caseinate may be substituted for milk to prepare whey containing CMP.

II. Clarifier

Small amounts of casein curds and lipids remain in these wheys, which are removed using a centrifuge, a cream separator or a clarifier prior to use, according to processes well known in the industry.

III. Adjust pH

The whey is then preferably adjusted to a pH greater than about 4, preferably about 5, using an acid such as phosphoric acid, hydrochloric acid, sulfuric acid, acetic acid, lactic acid, and citric acid, according to methods known to the art. A pH less than 4 would still allow the process to work although not as efficiently. A pH of 4 to 6 is most preferred because a pH less than about 4 does not allow for the binding of non-glycosylated CMP and a pH greater than about 6 tends to bind too much whey protein.

IV. Filter

Following pH adjustment, the whey may be filtered to avoid plugging of the anion exchanger if a fine microporous membrane or column packed with fine beads is utilized. Filtering is not necessary when using ion exchange membranes having large pores or columns packed with beads of large diameter. Filtering is accomplished by means known to art, such as 0.7 $\mu$m filter paper (Micro Filtration Systems, Dublin, Calif.). One advantage of filtering is that it allows increasing the flow rate of whey and other solutions through the ion exchanger without a significant increase in pressure drop or loss of performance.

V. Heat

Advantageously, the process can be conducted at elevated temperatures, ranging from 35° C. to 60° C., preferably at a temperature of about 40° C. Increasing the temperature increases the efficiency of the separations by increasing the diffusion coefficient of the solutes and decreasing the viscosity of the fluid. This decreases mass transfer limitations to attaining equilibrium in the separations and decreases pressure drops and restrictions to attaining rapid fluid flow.

VI. Anion Exchanger

The adjusted whey is contacted with an anion exchanger containing charged immobilized molecules such as diethylaminoethyl or quaternary amine moieties. Two fractions are produced after contacting the anion exchanger with whey: a whey protein fraction enriched in CMP and a whey solution depleted in CMP. Commercially available anion exchangers and methods of contacting anion exchangers with whey are well known in the art. If the pH of the whey is acidic, the whey may be adjusted to a pH of about 5 using an alkali such as sodium hydroxide, potassium hydroxide, and ammonia.

The fraction consisting of whey containing the unadsorbed compounds is removed from the anion exchanger. It contains the bulk of the whey proteins, lactose, minerals, and peptides. It can be used to make a whey protein concentrate that is depleted in CMP.

The adsorbed and eluted fraction of CMP (substantially free of impurities) can be eluted from the anion exchanger by increasing the ionic strength or decreasing the pH. Elution may be accomplished using a volatile buffer according to methods well-known to the art. Elution using 0.3M salt has been found to work well.

VII. Immobilized Metal Affinity Column

The whey protein fraction enriched in CMP is then contacted with an immobilized metal affinity adsorbent generally in an immobilized metal affinity column (IMAC), to separate the CMP from the remaining whey protein fraction. CMP is obtained as an effluent that is essentially free of other whey proteins and contaminants.

The present invention is directed towards optimizing techniques for the large-scale separation and purification of CMP from whey. Processes in which proteins are exposed to and bound to an IMAC resin and purified away from contaminants by selectively eluting the desired purified protein using the binding affinity of histidine residues for immobilized divalent copper ions are known to the art although not for the present invention (U.S. Pat. No. 5,169,936 to Staples et al.; U.S. Pat. No. 5,646,016 to McCoy et al.; U.S. Pat. No. 5,310,648 to Arnold et al.; and U.S. Pat. Nos. 5,641,539, 5,453,199 and 5,372,719 to Afeyan).

Metal chelate matrices consist of immobilized metal ions that bind to protein and peptide contaminants containing surface histidine and cysteine amino acid residues at around pH 6–8. Other whey proteins and peptide hydrolysis products of caseins and whey proteins contain these amino acids whereas CMP does not. According to the present invention, these residues are present at the surface of the molecule, and by contacting the fraction containing CMP with a metal chelate adsorbent, peptide and protein contaminants are removed by adsorption, purifying the fraction in CMP. For the chelating group and metal ion, iminodiacetic acid and $Cu^{2+}$, $Zn^{2+}$, $Ni^{2+}$, $Ca^{2+}$, $Co^{2+}$, and $Mg^{2+}$, respectively, may be exemplified. The materials and methods described above may be used for the immobilization matrix and contacting procedures for removal of peptide or protein contaminants.

IMAC adsorbents contain metal ions, such as Cu, Zn, Ni, Ca, Co and Mg, chelated to the adsorbent by immobilized iminodiacetic acid. The most commonly used metal ions are Cu and Ni. Ca and Zn are not preferred as they were found experimentally to bind to whey proteins with some difficulty.

VIII. Hydrolysis

The purified CMP may be hydrolyzed to form a food product having special medical and health benefits. Hydrolysis is the chemical reaction in which the amino acid chain of the protein reacts with water so as to be split into smaller molecular weight peptides and amino acids. Hydrolysis can be conducted by the use of acids (acid hydrolysis), alkalis (alkaline hydrolysis) or enzymes (enzyme hydrolysis). The use of enzymes is preferred. Examples of enzymes used for hydrolysis include alkaline, neutral, and acid proteases having endoprotease and exoprotease specificity; exopeptidases such as carboxypeptidase and aminopeptidase; and endopeptidases such as subtilisin. The enzyme may be contacted with the purified CMP in a batch reactor or a flow reactor. In a flow reactor, the enzyme may be immobilized to the same matrices as discussed above, i.e. beads, microporous membranes, and microporous papers.

Hydrolysis reactions are generally carried out over a temperature and pH range of from about 49° C.–60° C. and from about 4.0 to 6.0, respectively. Hydrolysis reaction times usually range between about 2 to 8 hours.

EXAMPLES

In order to more fully illustrate the present invention, the following Examples are provided. The Examples, which make reference to the attached Figures, are for illustration purposes only, to aid in a more complete understanding of the invention. The Examples do not limit the scope invention disclosed and claimed herein in any fashion.

Example 1

A water-jacketed chromatography column (XK 50/60, Pharmacia, Piscataway, N.J.) operated at 40° C. was packed with 500 ml of a quaternaryaminoethyl cellulose anion exchanger (QAE HB2 GibcoCel, Life Technologies, Rockville, Md.). Mozzarella cheese whey was adjusted to pH 5.0 using 1 M phosphoric acid and 5 L was pumped into the column in upflow at a flow rate of 75 ml/min. The anion exchanger was washed with 160 ml of water to remove contaminants lactose, minerals and fat. CMP was eluted from the ion exchanger using 1650 ml of 0.5 M sodium chloride. The elution solution was adjusted to pH 7.15 using 1 M sodium hydroxide and loaded in upflow at a flow rate of 15 ml/min into a chromatography column (C 26/40, Pharmacia) operated at 22° C. and packed with 50 ml of iminodiacetic acid agarose beads (Chelating Sepharose Fast Flow, Pharmacia) containing immobilized $Cu^{2+}$ metal ions. The beads were washed with 50 ml of 0.02 M sodium phosphate, 0.5 M sodium chloride, pH 7.15. The effluent up to this point was the substantially purified CMP product. The beads were washed with an additional 450 ml of pH 7.15 buffer, and eluted using 500 ml of 0.02 M sodium phosphate, 0.5 M sodium chloride, pH 3.45.

Referring to FIG. 1, the fractions were analyzed by SDS-PAGE using Coomassie Blue R-350 staining of a PhastGel Gradient 10–15 polyacrylamide gel from Pharmacia. Bands were identified via molecular weight markers (lane 1). Based on the observation that the effluent from the anion exchanger (lane 3) was substantially the same in protein content as the whey (lane 2), most of the proteins in the whey were not adsorbed onto the anion exchanger.

The elution solution was concentrated four-fold by ultrafiltration (8,000 NMWL Centricon Plus 80, Millipore, Bedford, Mass.) and applied to lane 4. It contained CMP, the forked band at 30 kDa, and whey protein impurities, notably β-lactoglobulin (18.3 kDa band) and some α-lactalbumin (14.4 kDa band). When a CMP standard (C 7278, Sigma, St. Louis, Mo.) was analyzed by SDS-PAGE, the same forked-shape characteristic and band location at 30 kDa was found. Although the molecular weight of CMP is about 7 kDa, the apparent molecular weight by gel permeation chromatography is 30 to 45 kDa, and is explained by its large volumisity due to internal electrostatic and stearic repulsion of negatively charged moieties (Minkiewicz et al., 1996).

CMP does not stain well compared to the other whey proteins because Coomassie dye interacts primarily with arginine residues, and weakly with histidine, lysine, tyrosine, tryptophan and phenylalanine. Because CMP does not contain arginine, histidine, tyrosine, tryptophan, and phenylalanine, and it contains a less than average number of lysine residues, it does not stain well using Coomassie dye reagent. Therefore, the actual concentration of CMP is much greater, and the concentration of whey protein impurities is much smaller, than is apparent based on the density of the bands in SDS-PAGE analysis.

The effluent from the IMAC column was concentrated one hundred-fold and applied to lane 5. It contained a high concentration of CMP as seen by the large forked band at 30 to 40 kDa, and greatly reduced amounts of the impurity whey protein α-lactalbumin and β-lactoglobulin.

Figure 2:
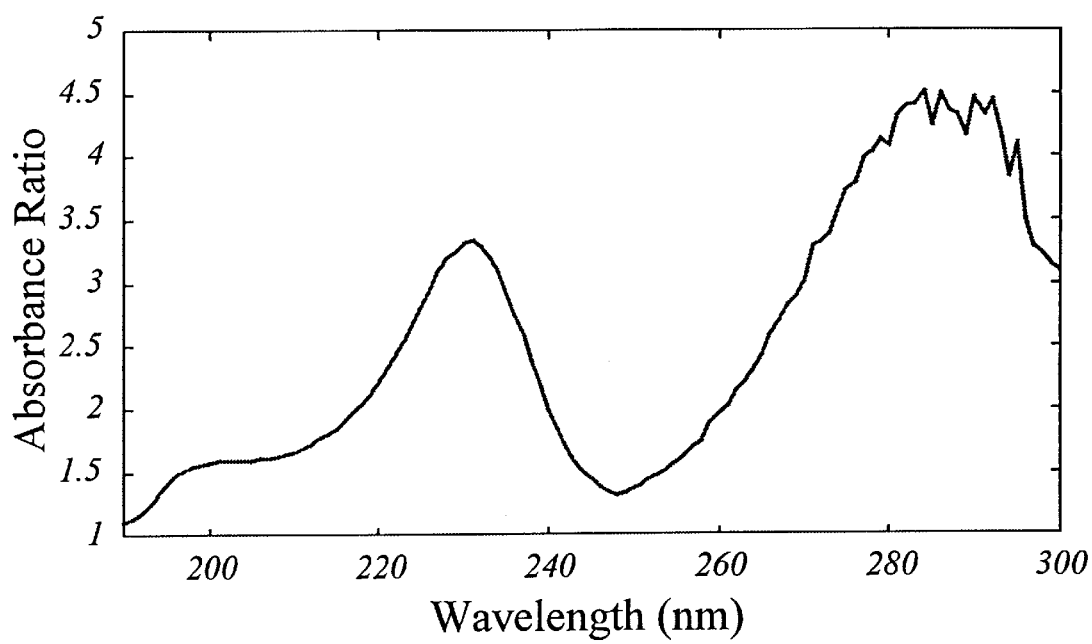
FIG. 2 is a graph showing the absorbance ratio (whey protein isolate÷CMP product) vs. wavelength in Example 1.

The effluent from the IMAC column (substantially purified CMP) was concentrated by ultrafiltration, freeze dried, rehydrated to 0.1 mg/ml in deionized water, and analyzed using a spectrophotometer. For comparison, whey protein isolate (BiPRO, Davisco Foods, Eden Prairie, Minn.), manufactured by cation exchange adsorption, was rehydrated to 0.05 mg/ml and analyzed in a similar manner. The ratio of the absorbances (whey protein isolate÷CMP) is plotted in FIG. 2. If the amino acid composition of the two protein samples were similar, then the ratio would be essentially independent of wavelength. However, this was not observed; instead there were strong peaks at 220 to 240 nm and at 280 to 300 nm, which are characteristic of aromatic amino acids tyrosine and tryptophan. Based on this result, tyrosine and tryptophan are present in the whey protein isolate, but not in the CMP, indicating that this product is pure by spectrophotometric analysis.

Amino acid analysis was performed on the freeze-dried IMAC effluent sample as illustrated in the following table:

TABLE 1

Amino Acid Analysis of Effluent
From IMAC Column and Whey Protein Isolate (WPI)

| Amino Acid[a] | Theoretical Value (mol %)[b] | IMAC (mol %) | WPI (Mol %) |
|---|---|---|---|
| Asx | 6.3 | 7.2 | 11.6 |
| Thr | 17.2 | 14.8 | 5.7 |
| Ser | 9.4 | 9.7 | 5.6 |
| Glx | 15.6 | 13.3 | 14.9 |
| Pro | 12.5 | 10.7 | 5.4 |
| Gly | 1.6 | 2.2 | 3.6 |
| Ala | 9.4 | 12.9 | 8.5 |
| Val | 9.4 | 8.0 | 5.9 |
| Met | 1.6 | 0.9 | 2.9 |
| Ile | 10.9 | 8.6 | 5.2 |
| Leu | 1.6 | 2.6 | 12.9 |
| Tyr | 0.0 | 1.8 | 2.6 |
| Phe | 0.0 | 1.0 | 2.5 |
| His | 0.0 | 0.6 | 1.6 |
| Lys | 4.7 | 5.0 | 9.2 |
| Arg | 0.0 | 0.7 | 1.9 |

[a]Cys & Trp were not analyzed.
[b]Values are based on amino acids analyzed only.

It was far closer in composition to the theoretical values for CMP than to whey protein isolate. Nevertheless, the IMAC sample was not absolutely pure CMP based on amino acid analysis because small amounts of tyrosine, phenylalanine, histidine, and arginine were detected in the sample, and pure CMP does not contain these amino acids. The amounts of these amino acids were less than found in whey protein isolate, and other amino acids were found at essentially the theoretical amounts, e.g. aspartic acid and asparagine, threonine, serine, glycine, leucine, and lysine. It is possible that the IMAC column (50 ml) was undersized and unable to remove all the impurities in the large volume of the eluted fraction (1650 ml) from the anion exchanger.

The elution peak from the IMAC column was concentrated 100-fold and applied to lane 6. It contained the whey protein impurities present in the elution peak from the anion exchanger (lane 4) and no CMP. Thus, the IMAC column bound the whey protein impurities but not the CMP product.

IMAC adsorbents can be eluted in several different ways. In all cases, 0.5 to 1.0 M sodium chloride is added to the eluting buffer to suppress ionic interactions. In this example, elution was with a pH change to 3.45. The nonprotonated imidazole-ring nitrogen atom of histidine is a powerful nucleophile, which binds to metal ions. The imidazole side chain is readily protonated at low pH, with a pKa of about 6.5, which destroys its metal-binding characteristic. By decreasing the pH to less than 6.0, non-specific elution of bound protein is effected. Nonspecific elution with strong chelators, e.g., ethylenediaminetetraacetic acid tetrasodium salt and sodium citrate, strips the metal ions and bound protein from the IMAC adsorbent. Specific elution may be effected by contacting the adsorbent with a displacer molecule, e.g., histidine and imidazole, that competes for binding to the immobilized metal ions. Because the pKa of the imidazole nitrogen of histidine depends on the local environment of the histidine within a given protein, elution using a gradient in displacer concentration will often resolve different proteins during elution.

Example 2

A chromatography column (XK 16/40, Pharmacia, Piscataway, N.J.) operated at 22° C. was packed with 50 ml of a quaternaryaminoethyl cellulose anion exchanger (QAE HB2 GibcoCel, Life Technologies, Rockville, Md.). Mozzarella cheese whey was adjusted to pH 5.0 using 1 M hydrochloric acid, filtered (2.5 $\mu$m, No. 42, Whatman, Fairfield, N.J.) and 250 ml pumped into the column at a flow rate of 4 ml/min. The anion exchanger was washed with 100 ml of water to remove contaminants lactose, minerals, and fat. CMP was eluted from the ion exchanger using 125 ml of 0.3 M sodium chloride. Residual bound whey protein impurities were eluted from the anion exchanger using 125 ml of 0.2 M sodium hydroxide. The sodium chloride elution solution was adjusted to pH 7.15 using 1 M sodium hydroxide and 30 ml loaded into a chromatography column (Econo-Pac, Bio-Rad Laboratories, Hercules, Calif.) operated at 22° C. and packed with 5 ml of iminodiacetic acid agarose beads (Chelating Sepharose Fast Flow, Pharmacia) containing immobilized $Cu^{2+}$ metal ions. The beads were washed with 10 ml of 0.02 M sodium phosphate, 0.5 M sodium chloride, pH 7.15. The effluent was the substantially-purified CMP product. The beads were washed with two additional 45 ml aliquots of pH 7.15 buffer, and eluted using 100 ml of 0.02 M sodium phosphate, 0.5 M sodium chloride, pH 3.45.

Figure 3:
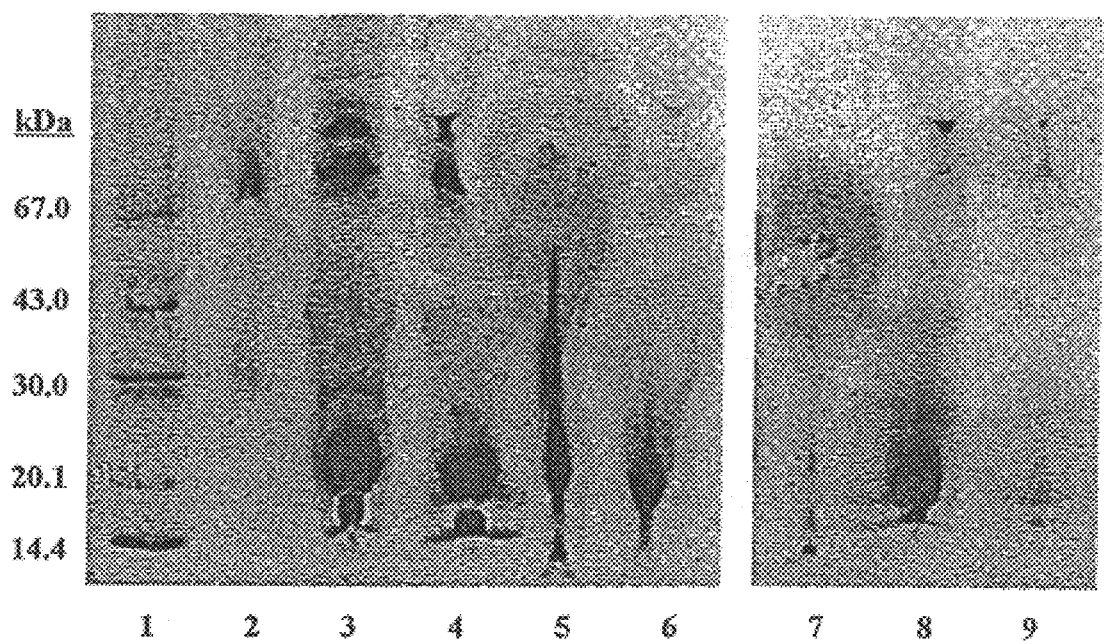
FIG. 3 is an SDS-PAGE analysis of the samples form the anion exchanger and the IMAC adsorbent in Example 2.

Fractions were analyzed by SDS-PAGE using Coomassie Blue R-350 staining of a PhastGel Gradient 10–15 polyacrylamide gel from Pharmacia as illustrated in FIG. 3. Bands were identified via molecular weight markers (LMW Marker Kit, Pharmacia) in lane 1. A protein standard, bovine immunoglobulin (I-5506, Sigma, St. Louis, Mo.), was applied to lane 2. The whey and effluent from the anion exchanger were concentrated five-fold by ultrafiltration (Centriprep-10, Millipore, Bedford, Mass.) an applied to the gel. Based on the observation that the effluent from the anion exchanger (lane 4) was substantially the same in protein content as the whey (lane 3), most of the proteins in the whey were not adsorbed onto the anion exchanger.

The sodium chloride elution solution from the anion exchanger was concentrated 400-fold by ultrafiltration (8,000 NMWL Centricon Plus-80, Millipore) and applied to lane 5. It contained a large amount of CMP, the large band at 30 to 70 kDa, and some whey protein impurities, mostly β-lactoglobulin (18.3 kDa band) and some α-lactalbumin (14.4 kDa band).

The sodium hydroxide elution solution from the anion exchanger was concentrated 400-fold by ultrafiltration (Centricon Plus-80) and applied to lane 6. It did not contain CMP, but did contain a substantial amount of whey protein impurities, mostly β-lactoglobulin (18.3 kDa band). Thus, 0.3 M sodium chloride removed all the bound CMP from the anion exchanger, but not all the bound whey protein impurities, resulting in a purification of the CMP.

The effluent from the IMAC column was concentrated 50-fold and applied to lane 7. It contained a high concentration of CMP as seen by the large band at 30 to 70 kDa, and greatly reduced amounts of the impurity whey proteins α-lactalbumin and β-lactoglobulin.

The first elution peak fraction from the IMAC column was concentrated 400-fold and applied to lane 8. It contained the whey protein impurities present in the sodium chloride elution solution from the anion exchanger (lane 5) and no CMP. Thus, the IMAC column bound the whey protein impurities and but not the CMP product. The second elution peak from the IMAC column was concentrated 400-fold and applied to lane 9. It contained a small amount of residual whey protein impurities.

It is understood that the invention is not confined to the particular construction and arrangement of parts herein illustrated and described, but embraces such modified forms thereof as come within the scope of the claims following the Bibliography.

BIBLIOGRAPHY

U.S. Pat. No. 5,169,936 to Staples et al.
U.S. Pat. No. 5,646,016 to McCoy et al.
U.S. Pat. No. 5,310,648 to Arnold et al.
U.S. Pat. No. 5,641,539 to Afeyan et al.
U.S. Pat. No. 5,453,199 to Afeyan et al.
U.S. Pat. No. 5,372,719 to Afeyan et al.
U.S. Pat. No. 5,278,288 to Kawasaki and Dosako.
U.S. Pat. No. 5,280,107 to Kawasaki et al.
Arnold & Haymore, 1991, *Science* 252, 1796–1797.
Buecher, S. et al., 1994, *J. Nutr. Biochem.*, 5, 578–584.
Corring, T. et al., 1997, *Proc. 1997 Intl. Whey Conf.*, Oct. 27–29, 34.
Dalgleish, D. G., 1982, *Developments in Dairy Chemistry*-1 *Functional Milk Proteins,* (Edited by P. F. Fox), pp. 1–53, Applied Science Publishers, New York.
Fox, P. F., 1989, *Developments in Dairy Chemistry*-4 *Functional Milk Proteins,* (Edited by P. F. Fox), pp 1–53. Elsevier Applied Science, New York.
Kawakami, H., et al., 1992, *Milchwissenschaft* 47, 688–693.
Kawasaki, Y., et al., 1993, *Milchwissenschaft* 48, 191–195.
Marshall, S. C., 1991, *Food Research Quarterly* 51, 86–89.
Minkiewicz et al., 1996, *J. Chromat.* 743, 123–135.
Outinen et al., 1995, *Milchwissenschaft* 50, 570–574.
Pedersen, B., 1994, *Food Technol.* 48, 96–98, 76.
Saito, T., et al., 1991, *Journal of Dairy Science*, 74, 2831–2837.
Shammet et al., 1992, *Milchwissenschaft* 47, 615–619.
Stan, E. et al., 1983, *Bull. Exp. Biol. Med.*, 96, 889–891.
Tanimoto, M. et al., 1992, *Bioscience, Biotechnology and Biochemistry,* 56, 140–141.

What is claimed is:

1. A process for producing κ-casein macropeptide from whey comprising:
    (a) a contacting the whey with an anion exchanger to yield a bound whey protein fraction enriched in κ-casein macropeptide and an unbound whey protein fraction depleted in κ-casein macropeptide; and then
    (b) contacting the bound whey protein fraction of step (a) with an immobilized metal affinity adsorbent whereby contaminants are adsorbed to the immobilized metal affinity adsorbent and thereby yielding an eluant containing purified κ-casein macropeptide.

2. The process of claim 1 comprising adjusting whey to a pH greater than 4 prior to contact with the anion exchanger.

3. The process of claim 1 comprising adjusting whey to a pH of about 5 prior to contact with the anion exchanger.

4. The process of claim 1 conducted at a temperature between about 35° C. and 60° C.

5. The process of claim 1 conducted at a temperature of about 40° C.

6. The process of claim 1 wherein the anion exchanger comprises porous membranes containing charged immobilized moieties.

7. The process of claim 1 wherein the immobilized metal affinity adsorbent comprises immobilized metal ions selected from the group according to Cu, Zn, Ni, Ca, Co and Mg.

8. The process of claim 1 wherein the immobilized metal affinity adsorbent comprises Cu.

9. The process of claim 1 further comprising hydrolyzing the amino acid chain of the κ-casein macropeptide product.

10. The process of claim 9 wherein the hydrolysis is caused by enzymes.

11. A process for producing κ-casein macropeptide from whey which comprises:
    (a) adjusting the whey to a pH greater than 4;
    (b) contacting the whey with an anion exchanger to yield a bound whey protein fraction enriched in κ-casein macropeptide and an unbound whey protein fraction depleted in κ-casein macropeptide;
    (c) eluting the bound whey protein fraction enriched in κ-casein macropeptide; and then
    (d) contacting the eluted bound whey protein fraction enriched in κ-casein macropeptide of step (c) with an immobilized metal affinity adsorbent whereby contaminants are adsorbed to the immobilized metal affinity adsorbent and thereby yielding an eluant containing purified κ-casein macropeptide.

12. The process of claim 11 wherein in step (c) the bound whey protein fraction enriched in κ-casein macropeptide is eluted with a salt solution.

13. The process of claim 12 wherein the salt solution is 0.5 molar sodium chloride.

14. The process of claim 11 comprising adjusting whey to a pH of about 5 prior to contact with the anion exchanger.

15. The process of claim 11 conducted at a temperature of about 40° C.

16. The process of claim 11 wherein the immobilized metal affinity adsorbent comprises immobilized metal ions selected from the group according to Cu, Zn, Ni, Ca, Co and Mg.

17. The process of claim 12 wherein the immobilized metal affinity adsorbent is Cu.

18. A process for producing from whey a whey protein concentrate substantially depleted in κ-casein macropeptide, the process comprising:
    (a) adjusting the whey to a pH greater than 4;
    (b) contacting the whey with an anion exchanger to yield a bound whey protein fraction enriched in κ-casein macropeptide and an unbound whey protein fraction depleted in κ-casein macropeptide; and
    (c) concentrating the unbound whey protein fraction depleted in κ-casein macropeptide.

19. The process of claim 18 further comprising contacting the bound whey protein fraction of step (b) with an immobilized metal affinity adsorbent whereby contaminants are adsorbed to the immobilized metal affinity adsorbent and thereby yielding an eluant containing purified κ-casein macropeptide.

* * * * *